United States Patent
Elledge et al.

(10) Patent No.: US 8,152,896 B2
(45) Date of Patent: Apr. 10, 2012

(54) SEPARATION OF FINE PARTICLE PRECIOUS METALS FROM CLAYS AND OTHER GANGUE MATERIALS THROUGH APPLICATION OF DILUTED SOLUTION OF A SILICON CHEMICAL

(75) Inventors: Earl Ben Elledge, Sugar Land, TX (US); George Stapleton, Sugar Land, TX (US)

(73) Assignee: Silicon Solutions LLC, Sugar Land, TX (US)

( * ) Notice: Subject to any disclaimer, the term of this patent is extended or adjusted under 35 U.S.C. 154(b) by 0 days.

(21) Appl. No.: 12/836,084

(22) Filed: Jul. 14, 2010

(65) Prior Publication Data

US 2011/0011214 A1  Jan. 20, 2011

Related U.S. Application Data

(60) Provisional application No. 61/225,663, filed on Jul. 15, 2009.

(51) Int. Cl.
*C22B 3/42* (2006.01)
(52) U.S. Cl. ............................................. 75/711; 75/739
(58) Field of Classification Search ................... 75/711, 75/739
See application file for complete search history.

(56) References Cited

U.S. PATENT DOCUMENTS

| | | | |
|---|---|---|---|
| 3,766,036 A | | 10/1973 | McKaveney |
| 4,735,783 A | * | 4/1988 | Bulatovic ........................ 423/26 |
| 5,700,369 A | * | 12/1997 | Zhou et al. .................... 209/166 |
| 2009/0071295 A1 | | 3/2009 | Gorain et al. |

OTHER PUBLICATIONS

Machine translation of CN 101342570 A by Yunbo Zhang. Publisheed Jan. 14, 2009.*

* cited by examiner

*Primary Examiner* — George Wyszomierski
*Assistant Examiner* — Tima M McGuthry Banks
(74) *Attorney, Agent, or Firm* — Sullivan & Worcester LLP; Christopher T. McWhinney

(57) ABSTRACT

The present invention generally relates to a formulation created by reacting sodium hydroxide, water, and silicon metal which has unique properties and many uses. The present invention further relates to the separation of fine particle gold and other precious metals from clays and other gangue materials through application of a diluted solution of a silicon chemical. The present invention further relates to the use of the diluted solution of the silicon chemical with vibration tables, concentrators, wash towers, hydro-cyclones and centrifuges and the like to aid in the separation of fine particle gold and other precious metals from clays and other gangue materials.

9 Claims, No Drawings

SEPARATION OF FINE PARTICLE PRECIOUS METALS FROM CLAYS AND OTHER GANGUE MATERIALS THROUGH APPLICATION OF DILUTED SOLUTION OF A SILICON CHEMICAL

CROSS-REFERENCE TO RELATED APPLICATION

This application claims the benefit of U.S. Provisional Application No. 61/225,663, filed Jul. 15, 2009.

FIELD OF THE INVENTION

The present invention generally relates to methods of using aqueous silicon solutions. In particular, the present invention relates to the separation of fine particle gold and other precious metals from clays and other gangue materials through application of an aqueous silicon solution.

BACKGROUND OF THE INVENTION

Currently there are no viable methods for separation of gold and other metals that are under 150 microns particle size from especially clay rich gangue material. A significant majority of the gold on the earth falls into this category, but most mining operations make no attempt whatsoever to recover gold in that particle size range. However, when the gold level is high enough, there have been efforts made to use sulfurous acid, cyanide or mercury based leaching processes to remove gold from the gangue material. These processes carry with them a number of significant environmental risks.

U.S. Pat. No. 7,293,568 and published U.S. Patent Application 2008-0178908, each of which is herein incorporated by reference in their entirety, teach methods of making stable, aqueous solutions of silicon. It has been unexpectedly discovered that aqueous solutions of silicon are useful in methods of extracting precious metals from clays and other gangue materials. These silicon chemical solutions are environmentally benign and enable the separation of fine gold and other precious metals from clay-rich gangue material by altering the ionic bonds between the clay and metal thereby allowing the use of industry standard vibration tables, concentrators, wash towers, hydro-cyclones and centrifuges and the like for separation and extraction of the precious metals from the gangue material.

SUMMARY OF THE INVENTION

The present invention generally relates to a formulation created by reacting sodium hydroxide, water, and silicon metal, which has unique properties and many uses.

The present invention also relates to methods of extracting precious metals from gangue material.

The present invention further relates to methods of extracting gold from gangue material.

The present invention further relates to various agents manufactured using formulations comprising aqueous solutions of silicon.

In one embodiment of the present invention, an aqueous silicon solution is mixed with water and used as a treating reagent in vibration tables, concentrators, wash towers, hydro-cyclones and/or centrifuges and the like to enhance the free settling characteristics of fine free gold and other precious metals in clay bearing placer type material by liberating the gold or other precious metals bound up in the clay.

A further embodiment of the present invention contemplates a method of extracting metals from metal containing gangue material including the steps of contacting metal containing gangue material with an aqueous silicon solution in a container, agitating the gangue material and aqueous silicon solution in the container, allowing metals contained in the gangue material to settle to the bottom portion of the container, and recovering the metals from the bottom portion of the container.

Methods in accordance with the present invention contemplate the use of aqueous silicon solutions in concentrations of various ranges including, but not limited to, solutions of at least 0.1% to 80% of aqueous silicon solution diluted in fresh water.

Particular methods in accordance with the present invention contemplate the use of aqueous silicon solutions in concentrations of various ranges including, but not limited to, concentrations of at least 0.5%, 1%, 3%, 5%, and 10% of aqueous silicon solution diluted in fresh water.

DETAILED DESCRIPTION OF THE INVENTION

For simplicity and illustrative purposes, the principles of the present invention are described by referring to various exemplary embodiments thereof. Although the preferred embodiments of the invention are particularly disclosed herein, one of ordinary skill in the art will readily recognize that the same principles are equally applicable to, and can be implicated in other compositions and methods, and that any such variation would be within such modifications that do not part from the scope of the present invention. Before explaining the disclosed embodiments of the present invention in detail, it is to be understood that the invention is not limited in its application to the details of any particular embodiment shown, since of course the invention is capable of other embodiments. The terminology used herein is for the purpose of description and not of limitation. Further, although certain methods are described with reference to certain steps that are presented herein in certain order, in many instances, these steps may be performed in any order as may be appreciated by one skilled in the art, and the methods are not limited to the particular arrangement of steps disclosed herein.

The present invention generally relates to a formulation created by reacting sodium hydroxide, water, and silicon metal, which has unique properties and many uses. In particular, the present invention relates to the unexpected finding that such solutions are useful in extracting precious metals from clay as well as other gangue materials. The present invention further relates to various methods and compositions using aqueous solutions of silicon for extracting precious metals from gangue materials.

The removal of sub-150 micron and smaller gold particles and other precious metal particles from clays and other gangue materials has been problematic and remains a functional barrier for common methods of precious metals separation and extraction. Such separation and extraction of gold and other precious metals is particularly difficult where the associated gangue material has elevated amounts of water sensitive clays such as bentonite, illite and others. The clay particles when exposed to water increase in size and such "swollen clay" particles are usually of a different electronic charge than the positively charged metals in the substrate, further complicating the removal of precious metals by conventional means. Even the use of high G-force concentrators has to date been largely unsuccessful in separating gold and other precious metals from clay bearing placer type material.

The large "wet clay" molecules with their large negatively charged area will attach to the smaller and positively charged gold or other metal particles impeding separation and extraction of the gold or other metal particles. The use of the diluted solutions of aqueous silicon facilitates the separation and extraction of the gold and other precious metals from the gangue materials.

The diluted solution of silicon material reacts with the interface between the entrained metal(s) and the clay and sand matrices (gangue material). Once these differently charged surfaces are "wet" in the atomic sense they will not again attach by ionic or by mechanical means. Thereafter the separation of the metal from the gangue material is greatly facilitated and may be accomplished by any number of common mechanisms including vibration tables, concentrators, wash towers, hydro-cyclones and centrifuges. The use of the silicon chemical diluted in varying ratios usually from 1% to 4% in fresh water usually will facilitate the separations. In cases where there are low pH materials associated with the gangue, the washing process may need to be repeated or the concentration levels of silicon chemical may need to be increased to as high as 10%.

Compositions for use in the methods of the instant invention are stable complexes of silicon metal in an aqueous solution. Such compositions may be produced in accordance with the steps outlined in U.S. Pat. No. 7,293,568 and published U.S. Patent Application 2008-0178908, each of which is herein incorporated by reference in their entirety.

In one embodiment of the present invention, an aqueous silicon solution is mixed with water into a 1%-4% solution and used as a treating reagent in vibration tables, concentrators, wash towers, hydro-cyclones and centrifuges and the like to enhance the free settling characteristics of fine free gold and other precious metals in clay bearing placer type material by liberating the gold or other precious metals bound up in the clay. The silicon chemical is used in conjunction with vibration tables, concentrators, wash towers, hydro-cyclones and centrifuges and the like to aid in the separation of fine particle gold and other precious metals from clays and other gangue materials.

EXAMPLE 1

The test procedure employed to demonstrate the effectiveness of the silicon chemical in facilitating the separation and extraction of fine particle gold from clay-rich gangue material was as follows:

5 kg of synthetic clay was prepared for metallurgical testing. The synthetic clay consisted of 80 percent by weight pulverized silica sand (approximate 100% passing 150 mesh), 20 percent by weight Halliburton Expanda Bentonite/Aquagel (approximate 100% passing 200 mesh). The synthetic clay mixture was riffle mixed and split into five 1000-gram test charges. A small sample of fine gold/placer concentrate or gold dust (100% passing 100 mesh) was re-screened at 200 mesh and weighed on a microbalance into portions that represented approximately 0.20 oz/ton of gold per one kilogram test charge (6.875 mg).

A preliminary shakedown test without reagent silicon chemical was conducted to learn physical characteristics of the synthetic clay, bentonite/pulverized silica sand mixture, when mixed with water. 1000 grams of synthetic clay was placed in a partially water filled 2000 ml graduated cylinder and agitated by hand shaking. Covering the open end of a graduated cylinder, then repeated inverting and returning to the original upright position (hand shaking) is standard procedure for conducting settling or sedimentation tests. A homogenous slurry was not achieved. More water was added up to the 2000 ml level (38% solids as specified) and agitated by hand. Again a homogenous slurry was not achieved.

A stainless steel rod with a perforated disc on the bottom was inserted into the partially mixed slurry and was pushed up and down until the mixture was more or less homogenized. The slurry had a paste-like consistency, not unlike slightly thin joint compound. A small piece of steel that was nearby (drill chuck key) was placed on top of the slurry and remained on top of the slurry even when the graduated cylinder was tapped on the side. Diluted silicon chemical was then added to the slurry and hand agitation was attempted. It appeared the diluted silicon chemical had a thinning effect on the top of the slurry, but could not be mixed throughout. The slurry was washed from the 2000 ml graduated cylinder into a 4000 ml graduated cylinder and brought up to just below the 3000 ml level. As little water as possible was used during the transfer. The slurry was agitated and appeared to have thinned considerably. A ¼" diameter steel ball was placed on top of the slurry. It immediately dropped to the bottom of the graduated cylinder. Now the slurry was too thin, possibly due to the silicon chemical that now was well mixed in the slurry. The test was aborted and the slurry was discarded Testing at lower percent solids was evaluated. Two 1000-gram test charges were mixed and split into four 500-gram test charges. A second shakedown test was conducted with 500 grams of synthetic clay in a 2000 ml graduated cylinder (22% solids). A good slurry appeared to be achieved when agitated by hand. This test became the baseline test with no reagent silicon chemical. Gold dust was added and the slurry re-agitated. The gold now represented approximately 0.40 oz/ton of gold per 500 gram test charge. As the baseline test was preliminary in nature the ratio of gold to bentonite/pulverized silica sand mixture was not considered to be of great importance. The idea was to see if the gold would remain suspended in the synthetic clay material with no reagent silicon chemical and then drop to the bottom when the silicon chemical was added in subsequent tests. The amount of gold utilized was not the purpose of the test. The effect of the silicon chemical on the clay-like slurry was the purpose of the test.

After vigorous hand agitation the slurry of synthetic clay, water, and fine gold dust was allowed to settle for 24 hours. The slurry did not appear to have thickened settled solids, as no clear water was seen on the top portion of the graduated cylinder and no interface in the slurry was observed. The top 80% (1600 ml) of the settled slurry was siphoned from the graduated cylinder by vacuum. The bottom 20% (400 ml) of the settled slurry was dumped and rinsed from the graduated cylinder. The slurry from the top and bottom portions of the graduated cylinder was treated separately and identically. The slurries were subjected to gravity concentration utilizing an Archimedes spiral (Gold Genie) in an effort get all or most of the gold into a relatively small weight that could be assayed in its entirety and therefore minimize the "nugget effect". The spiral concentrate and spiral tails were filtered, oven dried, and weighed. The concentrates were not pulverized. The entire concentrate from both top and bottom sections of the graduated cylinder were submitted for fire assay. The spiral tails from both top and bottom sections of the graduated cylinder were pulverized and fire assayed in triplicate (three a one assay ton portions weighing 29.166 grams each).

Metallurgical results from the preliminary baseline test indicated that the fine gold reported relatively uniformly to both the top 80% and bottom 20% of the graduated cylinder.

Based on the results obtained from the baseline test, continued testing with reagent silicon chemical was deemed to be warranted. Two tests at two different dosages of reagent silicon chemical were conducted. One test used a 20,000 ppm dosage and another test used a 40,000 ppm dosage. In an effort to obtain better calculated head versus assay head results triplicate fire assays were performed on the gravity tails from both top and bottom portions of settled solids.

The results of the selective settling and gravity concentration of incremental settled solids tests with and without reagent silicon chemical are outlined in Table 1 below.

TABLE 1

SUMMARY OF RESULTS

| Test No. | Test Description/ Chemical Dosage | Distribution Wt. (%) | | Distribution Au (%) | |
|---|---|---|---|---|---|
| | | Top 80% | Bottom 20% | Top 80% | Bottom 20% |
| ST/GC-01 | Baseline (No Dosage) | 78.0 | 22.0 | 69.8 | 30.2 |
| ST/GC-02 | Moderate Dosage | 58.3 | 41.7 | 2.8 | 97.2 |
| ST/GC-03 | High Dosage | 66.8 | 33.2 | 67.4 | 32.6 |

The results above reveal that the baseline test (Test ST/GC-01) achieved the stated goal of making synthetic clay that had characteristics that would keep fine free gold suspended in the slurry and not settle to the bottom of the graduated cylinder utilized in testing. The amount of gold in the top and bottom portions of the graduated cylinder was about the same in regard to weight and volume. The top 80 percent of the graduated cylinder contained 69.8 percent of the gold in 78.0 percent of the weight and the bottom 20 percent of the graduated cylinder contained 30.2 percent of the gold in 22.0 percent of the weight.

The results from the moderate (20,000 ppm) silicon chemical dosage test (Test ST/GC-02) indicated that the fine free gold settled preferentially to the bottom of the graduated cylinder and did not stay suspended in the slurry. The amount of gold in the top and bottom portions of the graduated cylinder was considerably different in regard to weight and volume. The top 80 percent of the graduated cylinder contained only 2.8 percent of the gold in 58.3 percent of the weight and the bottom 20 percent of the graduated cylinder contained 97.2 percent of the gold in 41.7 percent of the weight. The slurry appeared to have some thickened settled solids, but no clear water was seen on the top portion of the graduated cylinder. However, there was an interface in the slurry as the top 690 ml was a lighter color and appeared have less suspended solids than the 1310 ml below. This may explain why there is disproportionally more weight in the bottom 20 percent of the graduated cylinder relative to the volume.

The results from the high (40,000 ppm) silicon chemical dosage test (Test ST/GC-03) indicated that the fine free gold did not settle preferentially to the bottom of the graduated cylinder and stayed suspended in the slurry. The amount of gold in the top and bottom portions of the graduated cylinder was about the same in regard to weight and volume. The top 80 percent of the graduated cylinder contained 67.4 percent of the gold in 66.8 percent of the weight and the bottom 20 percent of the graduated cylinder contained 32.6 percent of the gold in 33.2 percent of the weight. The slurry appeared to have some thickened settled solids, but no clear water was seen on the top portion of the graduated cylinder. Similar to the ST/GC-02 at the moderate silicon chemical dosage, there was an interface in the slurry, but at a considerably different level in the graduated cylinder. The top 290 ml was a lighter color and appeared have less suspended solids than the 1710 ml below. The amount of gold in the top and bottom portions of the graduated cylinder were closer to the baseline test with no reagent silicon chemical added in regard to weight and volume than to the moderate reagent dosage test.

EXAMPLE 2

A second phase of testing included repeating the baseline test with no reagent silicon chemical, repeating the 20,000 ppm dosage test, and a silicon chemical dosage series that bracketed the 20,000 ppm test in an effort to determine the optimum dosage range.

1000-gram test charges of 20 percent by weight bentonite and 80 percent by weight pulverized silica sand mixture from Phase I testing were mixed and split into 500 gram test charges for use in Phase II testing. Also, as more 500 gram test charges were required, a new batch of synthetic clay was prepared identically as in Phase I utilizing 80 percent by weight pulverized silica sand (approximate 100% passing 150 mesh) and 20 percent by weight Halliburton Expanda Bentonite/Aquagel (approximate 100% passing 200 mesh) and then riffle mixed and split into eight 500 gram test charges.

Additional fine (minus 100 mesh) placer gold concentrate was procured and re-screened at 200 mesh, subjected to magnetic separation to remove magnetite commonly associated with placer concentrates, and subjected to elutriation to remove silica and other lower specific gravity minerals that might be present. This was done in an effort to achieve a gold dust product that was as pure as practically possible. The gold dust was weighed on a microbalance into portions that represented approximately 0.40 oz/ton of gold per 500 gram test charge (approximately 6.875 mg).

A series of six (6) tests was conducted employing the same metallurgical test procedures as Phase I testing. One test with no reagent added served as a repeat of the Phase I baseline test ST/GC-01 to insure that that the gold dust added was uniformly dispersed throughout the slurry and would not settle to the bottom of the graduated cylinder. A second corroborative test was conducted at a reagent silicon chemical dosage of 20,000 ppm and served as a repeat of Phase I test ST/GC-02 to confirm test procedure and results repeatability. Four (4) more tests, that bracketed the 20,000 ppm reagent silicon chemical dosage test were conducted so that a gold recovery in settled solids versus reagent dosage comparison could be made and the optimum reagent silicon chemical dosage range could determined. The dosages in the bracketing test series were 10,000 ppm, 15,000 ppm, 25,000 ppm, and 30,000 ppm (two dosages above and two dosages below 20,000 ppm).

The 50-gram test charges of synthetic clay were added to partially water filled 2000 ml graduated cylinders. The slurries were agitated vigorously by hand until a homogenous slurry was achieved. Reagent silicon chemical was added to the homogenous slurry at the specified dosages except for the repeat baseline test with no reagent. The slurry was again agitated until the reagent silicon chemical was well mixed. Now, the fine gold dust was added and more water was added to bring the slurry volume to 2000 ml. The slurry was again agitated until the fine gold dust was well mixed. The slurries in the six (6) graduated cylinders with various dosages of reagent silicon chemical or no reagent were allowed to settle for a period of 24 hours.

At the end of the settling period the top 80% (1600 ml) of the settled slurry was siphoned from the graduated cylinder by vacuum. The bottom 20% (400 ml) of the settled slurry was dumped and rinsed from the graduated cylinder. The slurry from the top and bottom portions of the graduated cylinder was treated separately and identically. The slurries were subjected to gravity concentration utilizing an Archimedes spiral (Gold Genie) in an effort get all or most of the gold into a relatively small weight that could be assayed in its entirety and therefore minimize the "nugget effect". The spiral concentrate and spiral tails were filtered, oven dried, and weighed. The concentrates were not pulverized. The entire concentrate from both top and bottom sections of the graduated cylinder were submitted for fire assay. The spiral tails from both top and bottom sections of the graduated cylinder were pulverized and fire assayed in triplicate (three one assay ton portions weighing 29.166 grams each).

The results of the selective settling and gravity concentration of incremental settled solids tests with and without reagent silicon chemical are outlined in Table 2 below. The results from Phase I test program are included for comparative purposes.

TABLE 2

SUMMARY OF PHASE I & II TEST RESULTS

| Test No. | Test Description/ Chemical Dosage (ppm) | Interface Level (ml) | Distribution Wt. (%) | | Distribution Au (%) | |
|---|---|---|---|---|---|---|
| | | | Top 80% | Bottom 20% | Top 80% | Bottom 20% |
| ST/GC-01 | Baseline/0 | N/A | 78.0 | 22.0 | 69.8 | 30.2 |
| ST/GC-04 | Baseline/0 | N/A | 77.8 | 22.2 | 63.7 | 36.3 |
| ST/GC-05 | 10,000 | 320 | 21.4 | 78.6 | 18.6 | 81.4 |
| ST/GC-06 | 15,000 | 340 | 17.9 | 82.1 | 8.2 | 91.8 |
| ST/GC-02 | 20,000 | 1310 | 58.3 | 41.7 | 2.8 | 97.2 |
| ST/GC-07 | 20,000 | 1270 | 58.7 | 41.3 | 41.5 | 58.6 |
| ST/GC-08 | 25,000 | 520 | 24.5 | 75.5 | 9.5 | 90.5 |
| ST/GC-09 | 30,000 | 1600 | 73.9 | 26.1 | 62.6 | 37.4 |
| ST/GC-03 | 40,000 | 1710 | 66.8 | 33.2 | 67.4 | 32.6 |

The results above reveal that the Phase I baseline test (Test ST/GC-01) achieved the stated goal of making synthetic clay that had characteristics that would keep fine free gold suspended in the slurry and not settle to the bottom of the graduated cylinder. The amount of gold in the top and bottom portions of the graduated cylinder was approximately 8 percent difference in regard to weight and volume. The top 80 percent of the graduated cylinder contained 69.8 percent of the gold in 78.0 percent of the weight and the bottom 20 percent of the graduated cylinder contained 30.2 percent of the gold in 22.0 percent of the weight.

The Phase II baseline test (Test ST/GC-04) was conducted under the same conditions as Phase I Test ST/GC-01 and yielded similar results. The amount of gold in the top and bottom portions of the graduated cylinder was approximately 13 percent difference in regard to weight and volume. The top 80 percent of the graduated cylinder contained 63.7 percent of the gold in 77.8 percent of the weight and the bottom 20 percent of the graduated cylinder contained 36.3 percent of the gold in 22.2 percent of the weight.

The results from the 20,000 ppm silicon chemical dosage Phase I test (Test ST/GC-02) indicated that the fine free gold settled preferentially to the bottom of the graduated cylinder and did not stay suspended in the slurry. The amount of gold in the top and bottom portions of the graduated cylinder was considerably different in regard to weight and volume. The top 80 percent of the graduated cylinder contained only 2.8 percent of the gold in 58.3 percent of the weight and the bottom 20 percent of the graduated cylinder contained 97.2 percent of the gold in 41.7 percent of the weight. There was an interface in the slurry at a level of 1310 ml. The top 690 ml was a lighter color and appeared have less suspended solids than the 1310 ml below that was darker in color and appeared to have more solids. This may explain why there was disproportionally more weight in the bottom 20 percent of the graduated cylinder relative to the volume.

The Phase II 20,000 ppm silicon chemical dosage Phase I test (Test ST/GC-07) was conducted under the same conditions as Phase I Test ST/GC-02, and yielded both similar and anomalous results. The fine free gold only partially settled preferentially to the bottom of the graduated cylinder and partially stayed suspended in the slurry. The amount of gold in the top portion of the graduated cylinder was moderately lower than the amount of gold in the bottom portion of the graduated cylinder in regard to weight and volume. The top 80 percent of the graduated cylinder contained 41.5 percent of the gold in 58.7 percent of the weight and the bottom 20 percent of the graduated cylinder contained 58.6 percent of the gold in 41.3 percent of the weight. The amount of gold in top and bottoms portions of Test GC/ST-07 differed considerably from amount of gold in top and bottoms portions of Test GC/ST-02. However, the percent weight in the top portions were almost identical at 58.7 percent in Test GC/ST-07 and 58.3 percent in GC/ST-02. Likewise, the percent weight in the bottom portions were almost identical at 41.3 percent in Test GC/ST-07 and 41.7 percent in GC/ST-02. Also, the slurry interface levels were very close at 1270 ml in Test GC/ST-07 and 1310 ml in Test GC/ST-02. There is no good explanation for the large difference in the settling characteristics of the gold between the two tests, especially when the difference in the weight percent in the top and bottom portions and the slurry interface levels were so small.

The results from the 10,000 ppm silicon chemical dosage Phase II test (Test ST/GC-05) indicated that the fine free gold settled preferentially to the bottom of the graduated cylinder, but not to the extent as Phase I Test GC/ST-02. The amount of gold in the top and bottom portions of the graduated cylinder was relatively close in regard to weight and volume, but the most of the gold reported to the bottom portion of the graduated cylinder. The top 80 percent of the graduated cylinder contained 18.6 percent of the gold in 21.4 percent of the weight and the bottom 20 percent of the graduated cylinder contained 81.4 percent of the gold in 78.6 percent of the weight. The slurry interface level of 320 ml was at a considerably lower level than the 20,000 ppm reagent silicon chemical dosage test at 690 ml.

The results from the 15,000 ppm silicon chemical dosage Phase II test (Test ST/GC-06) indicated that the fine free gold settled preferentially to the bottom of the graduated cylinder, not to the extent as Phase I Test GC/ST-02, but to a greater extent than Phase II test (Test ST/GC-05). The amount of gold in the top and bottom portions of the graduated cylinder was approximately 10 percent different in regard to weight and volume. Most of the gold reported to the bottom portion of the graduated cylinder. The top 80 percent of the graduated cylinder contained only 8.2 percent of the gold in 17.9 percent of the weight and the bottom 20 percent of the graduated cylinder contained 91.8 percent of the gold in 82.1 percent of the weight. The slurry interface level of 340 ml was at a considerably lower level than the 20,000 ppm reagent silicon chemical dosage tests and almost identical to the 10,000 ppm reagent silicon chemical dosage tests.

The results from the 25,000 ppm silicon chemical dosage Phase II test (Test ST/GC-08) indicated that the fine free gold settled preferentially to the bottom of the graduated cylinder, not to the extent as Phase I Test GC/ST-02, but to a greater extent than Phase II test (Test ST/GC-05) and almost equal to Phase II test (Test ST/GC-06). The amount of gold in the top and bottom portions of the graduated cylinder was approximately 15 percent different in regard to weight and volume. Most of the gold reported to the bottom portion of the graduated cylinder. The top 80 percent of the graduated cylinder contained only 9.5 percent of the gold in 24.5 percent of the weight and the bottom 20 percent of the graduated cylinder contained 90.5 percent of the gold in 75.5 percent of the weight. The slurry interface level of 520 ml was at a considerably lower level than the 20,000 ppm reagent silicon chemical dosage test at 690 ml and higher than the 10,000 ppm and 15,000 ppm reagent silicon chemical dosage tests at 320 ml and 340 ml respectively.

The results from the 30,000 ppm silicon chemical dosage Phase II test (Test ST/GC-09) indicated that the fine free gold did not settled preferentially to the bottom of the graduated cylinder and stayed suspended in the slurry similar to Phase I test (Test ST/GC-03), but to a lesser extent. The amount of gold in the top and bottom portions of the graduated cylinder was approximately 10 percent different in regard to weight and volume. Most of the gold reported to the top portion of the graduated cylinder. The top 80 percent of the graduated cylinder contained 64.6 percent of the gold in 73.9 percent of the weight and the bottom 20 percent of the graduated cylinder contained 37.4 percent of the gold in 26.1 percent of the weight. The slurry interface level of 1600 ml was the closet to Phase I test (Test ST/GC-03) at the highest reagent silicon chemical dosage of 40,000 ppm at 1710 ml.

The results from the high (40,000 ppm) silicon chemical dosage Phase I test (Test ST/GC-03) indicated that the fine free gold did not settle preferentially to the bottom of the graduated cylinder and stayed suspended in the slurry. The amount of gold in the top and bottom portions of the graduated cylinder was about the same in regard to weight and volume. The top 80 percent of the graduated cylinder contained 67.4 percent of the gold in 66.8 percent of the weight and the bottom 20 percent of the graduated cylinder contained 32.6 percent of the gold in 33.2 percent of the weight. The slurry interface level of 1710 ml was the highest of all test conducted and closet to the 30,000 ppm reagent silicon chemical dosage in Phase II test (Test ST/GC-08) at 1600 ml.

Calculated heads versus assay heads from all tests conducted with reagent silicon chemical did not check well, even with triplicate fire assay of gravity tails that did check well. The poor checks between calculated heads and assay heads are likely due to impurities in the gold dust and are inherent to the spotty nature of "free" gold. The relationship between slurry interface level and the difference in slurry viscosity and percent weight of solids in top and bottom portions of the graduated cylinder is difficult to understand at this point in the metallurgical test program, but could become better understood with continued testing and more data. The anomalous results reported in the duplicate Phase II test (Test ST/GC-07) conducted at reagent silicon chemical dosage of 20,000 ppm is confusing. However, test data reveals a trend that reagent silicon chemical is effective in a dosage range of 10,000 to 25,000 ppm for this particular manufactured gangue material.

While the invention has been described with reference to certain exemplary embodiments thereof, those skilled in the art may make various modifications to the described embodiments of the invention without departing from the scope of the invention. The terms and descriptions used herein are set forth by way of illustration only and are not meant as limitations. In particular, although the present invention has been described by way of examples, a variety of compositions and methods would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the scope of the invention as defined in the following claims and their equivalents.

What is claimed is:

1. A method of extracting metals from metal containing gangue material comprising:
   contacting metal containing gangue material with an aqueous silicon solution in a container;
   agitating the gangue material and aqueous silicon solution in the container;
   allowing metals contained in the gangue material to settle to the bottom portion of the container; and
   recovering the metals from the bottom portion of the container.

2. The method of claim 1, wherein the gangue material is clay.

3. The method of claim 1, wherein the metal is a precious metal.

4. The method of claim 1, wherein the metal is gold.

5. The method of claim 1, wherein aqueous silicon solution is at a concentration of at least 0.5%.

6. The method of claim 1, wherein the aqueous silicon solution is at a concentration of at least 1.0%.

7. The method of claim 1, wherein the aqueous silicon solution is at a concentration of at least 2.0%.

8. The method of claim 1, wherein the aqueous silicon solution is at a concentration of at least 3.0%.

9. The method of claim 1, wherein the aqueous silicon solution is at a concentration of at least 10.0%.

* * * * *